United States Patent [19]
Elqadah et al.

[11] Patent Number: 6,033,017
[45] Date of Patent: *Mar. 7, 2000

[54] VEHICLE OCCUPANT PROTECTION APPARATUS

[75] Inventors: Wael S. Elqadah; Xingyuan Sun, both of Gilbert; Jess A. Cuevas, Scottsdale, all of Ariz.

[73] Assignee: TRW Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/057,815

[22] Filed: Apr. 9, 1998

[51] Int. Cl.⁷ ........................................ B60N 2/42
[52] U.S. Cl. .................... 297/216.1; 297/216.13; 297/408; 297/486
[58] Field of Search ............................ 297/216.1, 216.12, 297/216.13, 216.15, 474, 484, 486, 391, 406, 408, 409

[56] References Cited

U.S. PATENT DOCUMENTS

| | | |
|---|---|---|
| 2,873,122 | 2/1959 | Peras . |
| 3,397,911 | 8/1968 | Brosius, Sr. . |
| 3,420,572 | 1/1969 | Bisland . |
| 3,623,768 | 11/1971 | Capener et al. . |
| 3,713,694 | 1/1973 | Miller . |
| 3,832,003 | 8/1974 | Horvat ............................. 297/216.13 |
| 3,899,042 | 8/1975 | Bonar . |
| 3,901,550 | 8/1975 | Hamy . |
| 5,052,754 | 10/1991 | Chinomi . |
| 5,378,043 | 1/1995 | Viano et al. . |
| 5,484,189 | 1/1996 | Patterson . |
| 5,669,661 | 9/1997 | Pajon . |
| 5,836,648 | 11/1998 | Karschin et al. .................. 297/216.13 |

*Primary Examiner*—Laurie K. Cranmer
*Attorney, Agent, or Firm*—Tarolli, Sundheim, Covell, Tummino & Szabo L.L.P.

[57] ABSTRACT

An apparatus includes a vehicle seat (10) and an actuating assembly (80). The seat (10) has a wing (34) which is movable from a retracted position to a deployed position. When the wing (34) is in the deployed position, it projects adjacent to an occupant the seat (10) to restrain movement of the occupant off the seat (10). The actuating assembly (80) moves the wing (34) from the retracted position to the deployed position upon the occurrence of a vehicle crash.

19 Claims, 4 Drawing Sheets

VEHICLE OCCUPANT PROTECTION APPARATUS

FIELD OF THE INVENTION

The present invention relates to a vehicle seat.

BACKGROUND OF THE INVENTION

Vehicle crash forces may tend to move an occupant of a vehicle seat off the seat. For example, a side impact crash force may tend to move an occupant off the seat in a sideways direction. A rollover crash force also may tend to move an occupant off the seat in a sideways direction, and may further tend to move the occupant upward from the seat.

SUMMARY OF THE INVENTION

In accordance with the present invention, an apparatus comprises a vehicle seat and an actuating assembly. The seat has a wing which is movable from a retracted position to a deployed position. When the wing is in the deployed position, it projects adjacent to an occupant of the seat to restrain movement of the occupant off the seat. The actuating assembly moves the wing from the retracted position to the deployed position upon the occurrence of a vehicle crash.

In a preferred embodiment of the present invention, the actuating assembly includes a sensor which senses a vehicle condition indicating the occurrence of a crash. The actuating assembly in the preferred embodiment further includes means for moving the wing from the retracted position to the deployed position under the influence of a vehicle crash force imparted to the seat by an occupant of the seat.

BRIEF DESCRIPTION OF THE DRAWINGS

The foregoing and other features of the present invention will becomes apparent to one skilled in the art to which the present invention relates upon reading the following description with reference to the accompanying drawings, wherein.

DESCRIPTION OF A PREFERRED EMBODIMENT

Figure 1:
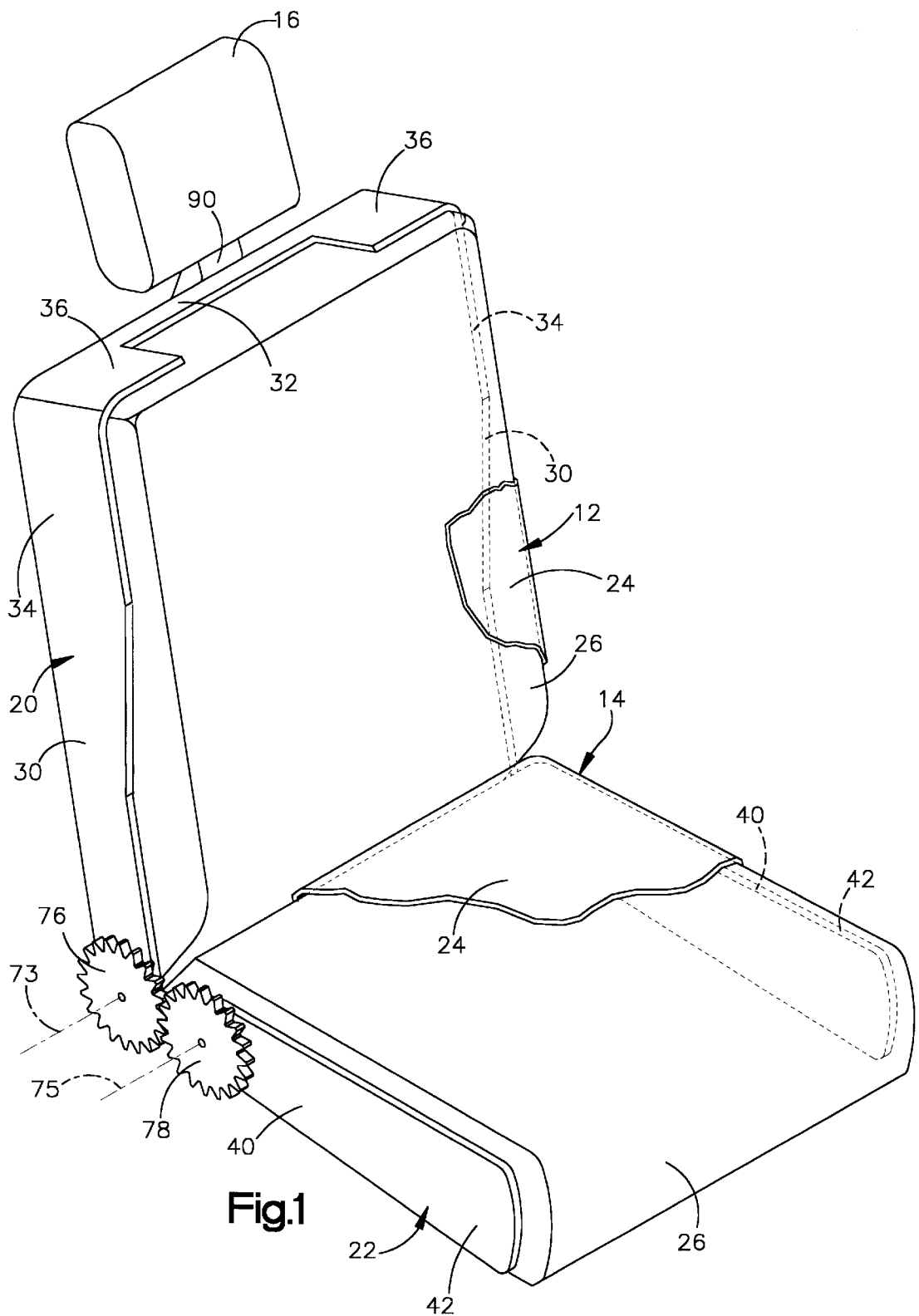
FIG. 1 is an isometric view, taken from the front, of parts of an apparatus comprising a preferred embodiment of the present invention.
Figure 2:
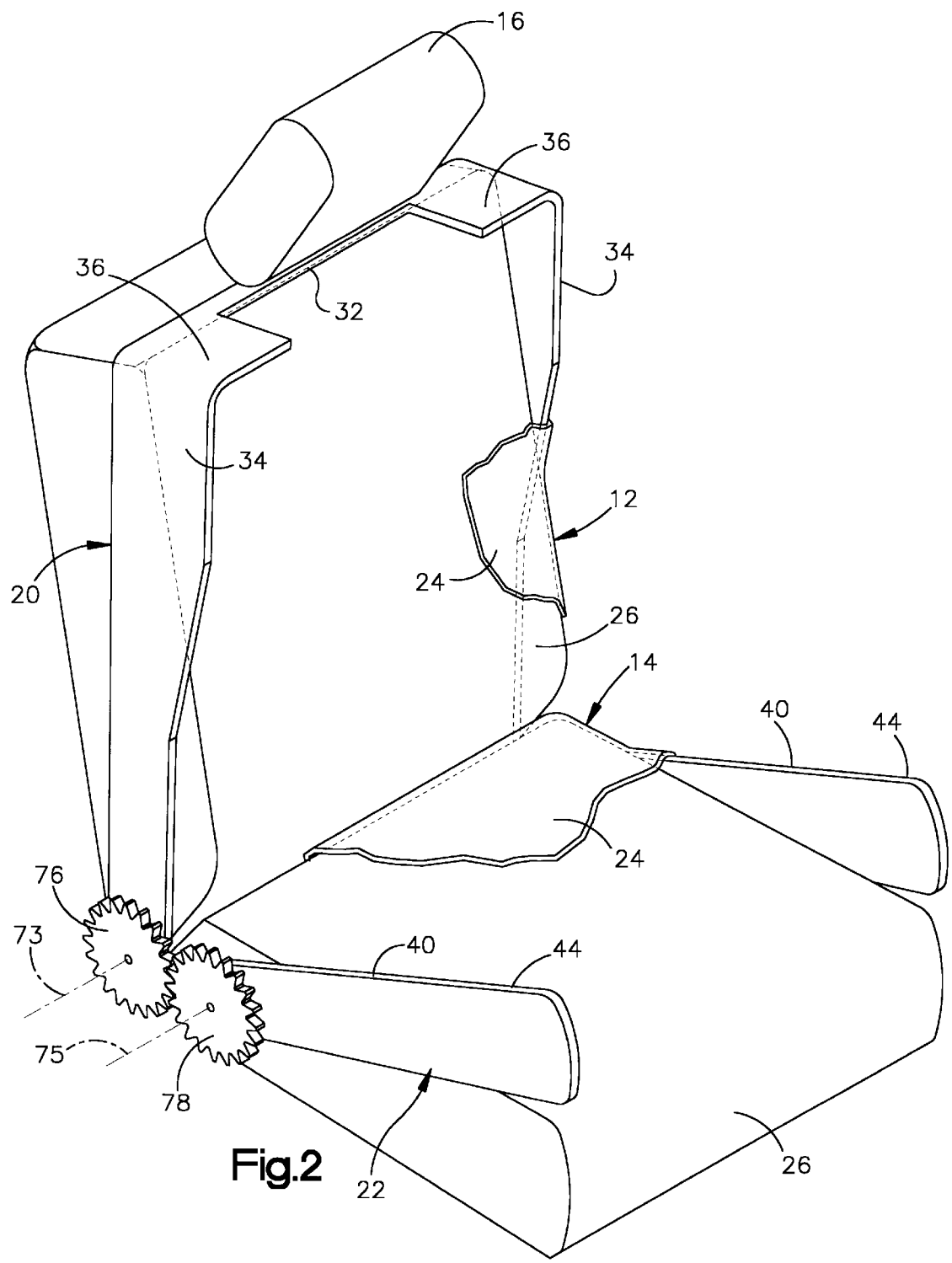
FIG. 2 is a view similar to FIG. 1 showing parts in different positions.

A vehicle seat 10 constructed in accordance with the present invention is shown partially in FIGS. 1 and 2. The parts of the seat 10 shown in FIGS. 1 and 2 include a back cushion 12, a bottom cushion 14, and a headrest 16. The parts shown in FIG. 1 further include upper and lower wing structures 20 and 22. The wing structures 20 and 22 are moved pivotally from retracted positions (FIG. 1) to deployed positions (FIG. 2) upon the occurrence of a vehicle crash.

Each of the cushions 12 and 14 is a deflectable structure comprising an outer layer 24 on a compressible base 26. The outer layers 24 are preferably formed of fabric or leather. The bases 26 are preferably formed of elastomeric foam.

The upper wing structure 20 is covered by the outer layer 24 of the back cushion 12, and partially overlies the foam base 26 of the back cushion 12. Specifically, the upper wing structure 20 has a pair of vertically elongated side sections 30 adjoining the opposite sides of the foam base 26. The side sections 30 are joined by a horizontally elongated top section 32 which extends across the top of the foam base 26. Each side section 30 has a widened upper end portion 34. The top section 32 has widened opposite end portions 36.

The widened portions 34 and 36 of the upper wing structure 20 are wings that restrain movement of an occupant of the seat 10 in accordance with the present invention. When the upper wing structure 20 is in the retracted position of FIG. 1, the wings 34 and 36 are located behind the occupant. When the upper wing structure 20 has been moved to the deployed position of FIG. 2, the wings 34 at the side sections 30 project forward beside the occupant's upper arms. Those wings 34 can then restrain movement of the occupant's arms outward from the opposite sides of the seat 10. The wings 36 at the top section 32 similarly project forward over the occupant's shoulders to restrain movement of the occupant upward from the seat 10. The outer layer 24 of the back cushion 12 stretches as needed to permit such movement of the upper wing structure 20 relative to the foam base 26.

The lower wing structure 22 is covered by the outer layer 24 of the bottom cushion 14, and has a pair of side sections 40 adjoining opposite sides of the foam base 26 of the bottom cushion 14. Each side section 40 has a widened forward end portion 42 defining a wing. When the lower wing structure 22 has been moved to the deployed position of FIG. 2, the wings 42 project upward beside the adjacent foam base 26, and thus project upward beside the occupant's legs to restrain movement of the occupant's legs outward from the opposite sides of the seat 10. The outer layer 24 of the bottom cushion 14 also stretches as needed upon deployment of the corresponding wing structure 22.

Figure 3:
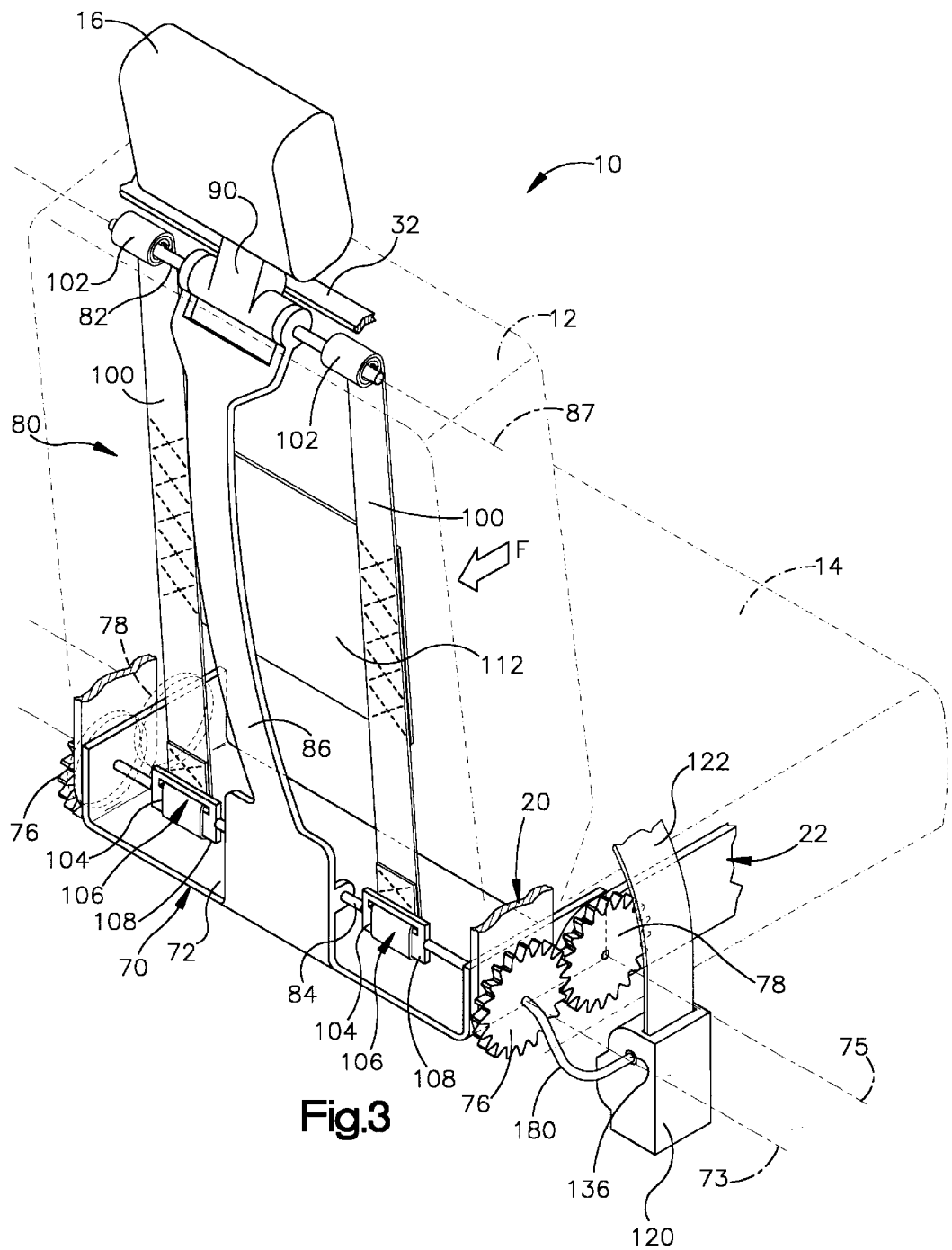
FIG. 3 is an isometric view, taken from behind, showing additional parts of the apparatus of FIG. 1.

As shown in FIG. 3, the upper and lower wing structures 20 and 22 are mounted on a frame 70. The frame 70 has a horizontally elongated base 72. The upper wing structure 20 is supported at opposite ends of the base 72 for movement pivotally about a first axis 73. The lower wing structure 22 is supported at opposite ends of the base 72 for movement pivotally about a second axis 75. A pair of gears 76 are fixed to the upper wing structure 20 at locations centered on the first axis 73. The gears 76 on the upper wing structure 20 mesh with a pair of gears 78 that are fixed to the lower wing structure 22 at locations centered on the second axis 75. In this arrangement, the upper and lower wing structures 20 and 22 are interconnected by the meshing gears 76 and 78 so as to pivot simultaneously between their retracted and deployed positions.

An actuating assembly 80 deploys the wing structures 20 and 22 upon the occurrence of a vehicle crash. As shown partially in FIG. 3, the actuating assembly 80 includes an upper shaft 82 and a lower shaft 84. The lower shaft 84 is fixed at its opposite ends to the gears 76 on the upper wing structure 20. A central portion 86 of the frame 70 supports the lower shaft 84 for rotation about the first axis 73. The central portion 86 of the frame similarly supports the upper shaft 82 for rotation about a third axis 87. An actuator arm 90 is fixed to the upper shaft 82, and pivots about the third axis 87 upon rotation of the upper shaft 82 about the third axis 87. The actuator arm 90 is thus movable pivotally back and forth between the rearward and forward positions shown in FIGS. 1 and 2, respectively.

The headrest 16 is mounted on the actuator arm 90. When the actuator arm 90 pivots forward, it carries the headrest 16 forward to restrain rearward movement of a seated occupant's head. Additionally, the actuator arm 90 moves forward against the top section 32 of the upper wing structure 20 so as to push the upper wing structure 20 forward to its deployed position. The lower wing structure 22 simultaneously moves to its deployed position under the influence of the meshing gears 76 and 78, as described above.

A pair of straps 100 extend vertically between the shafts 82 and 84 at the back of the seat 10. Upper end portions 102 of the straps 100 are wound on the upper shaft 82. Lower end portions 104 of the straps 100 extend through slots 106 in a pair of anchor bars 108 that are welded to the lower shaft 84. The lower end portions 104 of the straps 100 are fastened around the anchor bars 108 in closed loops, and are thus fastened to the anchor bars 108 such that rotation of the lower shaft 84 about the first axis 73 tends to wind the straps 100 onto the anchor bars 108. An actuator panel 112 spans the straps 100 between the upper and lower end portions 102 and 104 of the straps 100.

When a crash force acts against the vehicle in a forward direction (e.g., the vehicle is struck from the rear), an occupant of the seat 10 may experience inertial movement relative to the seat 10 in a rearward direction. The back cushion 12 may then transmit a vehicle crash force F from the occupant to the actuator panel 112, as indicated by the arrow shown in FIG. 3. This would impart tension to the straps 100 by deflecting the panel 112 and the straps 100 rearwardly. If the crash force F meets or exceeds a predetermined threshold level, the resulting tension in the straps 100 will unwind the upper end portions 102 so as to rotate the upper shaft 82 in a clockwise direction, as viewed in FIG. 3. The actuator arm 90 will then pivot forward so as to move the headrest 16 and the wing structures 20 and 22 to their deployed positions.

The actuating assembly 80 further includes a seat belt pretensioner 120. The pretensioner 120 is a known device that imparts tension to seat belt webbing 122 to help restrain an occupant of the seat 10 upon the occurrence of a vehicle crash.

Figure 4:
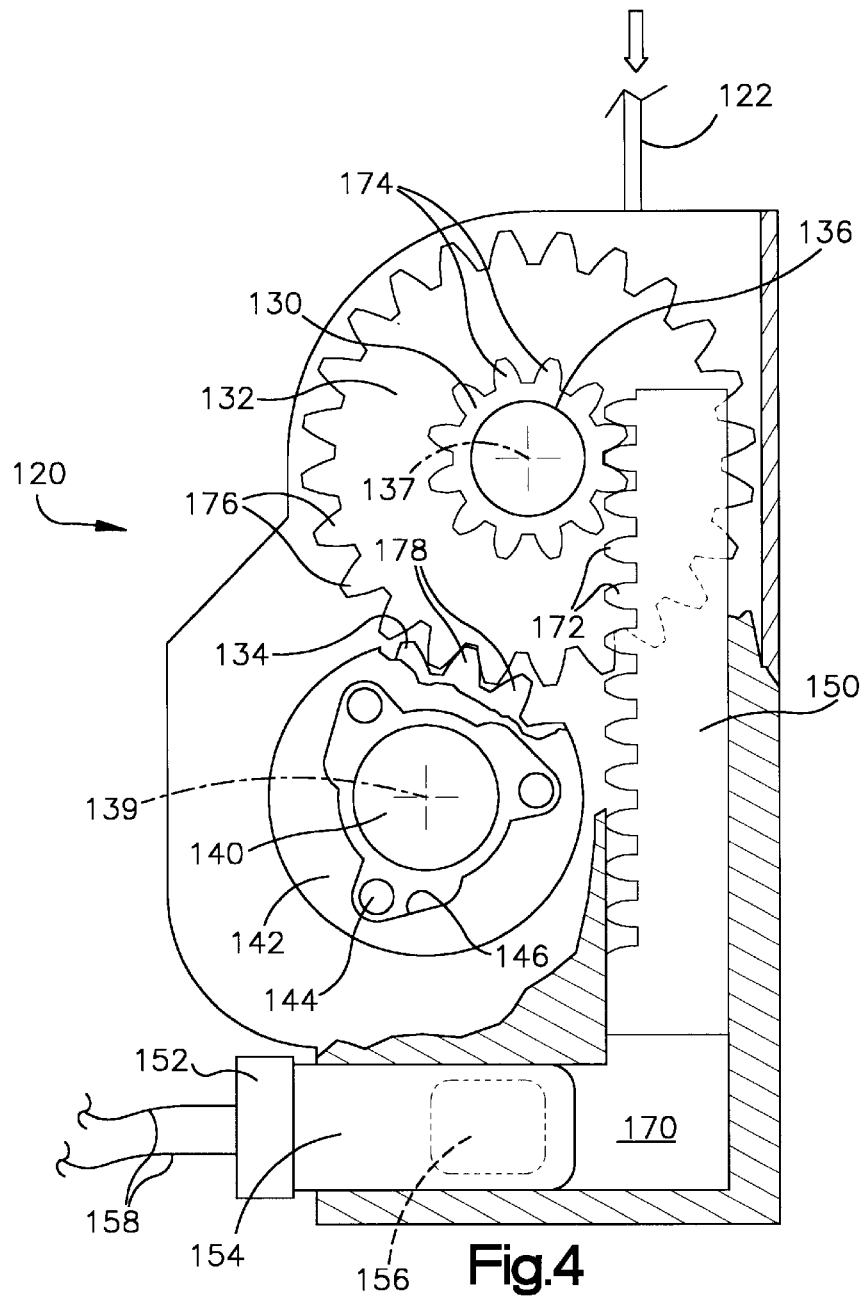
FIG. 4 is an enlarged, partly sectional view of parts shown in FIG. 3.

As shown in detail in FIG. 4, the pretensioner 120 in the preferred embodiment of the present invention is a particular type of pretensioner which includes first, second and third gears 130, 132 and 134. The first and second gears 130 and 132 are mounted on a shaft 136 to rotate about an axis 137 with the shaft 136. The third gear 134 is supported for rotation about an axis 139 spaced from the axis 137.

The webbing 122 is wound on a retractor spool 140 which is centered on the axis 139. A coupling device 142 is operatively connected between the third gear 134 and the spool 140. As known in the art, the coupling device 142 includes a plurality of rollers 144 and a corresponding plurality of cam surfaces 146. When the third gear 134 is rotated about the axis 139 in a clockwise direction, as viewed in FIG. 4, the cam surfaces 146 move the rollers 144 forcefully against the spool 140 to establish a rotational driving connection between the third gear 134 and the spool 140.

The pretensioner 120 further includes a piston 150 and an electrically actuatable squib 152. The squib 152 is a known device with a cylindrical casing 154 containing a small charge 156 of pyrotechnic material. The charge 156 of pyrotechnic material is ignited in a known manner upon the passage of electric current through the squib 152 between a pair of leads 158 extending from the casing 154.

Figure 5:
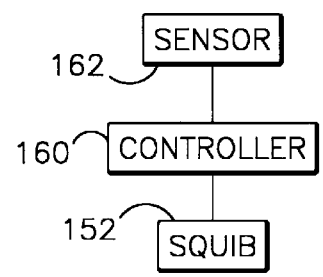
FIG. 5 is a block diagram showing additional parts of the apparatus of FIG. 1.

As shown in FIG. 5, other parts of the actuating assembly 80 include a controller 160 and a crash sensor 162. The crash sensor 162 senses one or more vehicle conditions indicating the occurrence of a crash. The crash sensor 162 may thus sense a frontal, rear-end, side impact, and/or rollover crash, as known in the art. If the crash-indicating condition has at least a predetermined threshold level of severity, it indicates the occurrence of a crash for which use of the pretensioner 120 is desired to help restrain an occupant of the seat 10. The controller 160 will then respond to the crash sensor 162 by actuating the squib 152.

When the squib 152 is actuated by the controller 160, it spews pyrotechnic combustion products into a chamber 170 (FIG. 4) in the pretensioner 120. The combustion products in the chamber 170 develop a thrust which moves the piston 150 upward. Gear teeth 172 on the piston 150 then move against meshing gear teeth 174 on the first gear 130 so as to rotate the shaft 136 and the first and second gears 130 and 132 about the axis 137 in a counterclockwise direction, as viewed in FIG. 4. Gear teeth 176 on the second gear 132 are then driven against meshing gear teeth 178 on the third gear 134 so as to rotate the third gear 134 in the clockwise direction. This causes the coupling device 142 to rotate the spool 140 in the clockwise direction. Such rotation of the spool 140 imparts tension to the webbing 122 by winding the webbing 122 further onto the spool 140.

As shown in FIG. 3, a flexible coupling 180 extends from the shaft 136 in the pretensioner 120 to the lower shaft 84 on the seat 10. The coupling 180 preferably comprises a steel cable, but may alternatively comprise any other suitable flexible coupling structure. When the piston 150 rotates the shaft 136 upon actuation of the squib 152, the coupling 180 imparts simultaneous rotation to the lower shaft 84. As noted above, the lower shaft 84 is fixed to the gears 76 on the upper wing structure 20. Therefore, when the lower shaft 84 rotates under the influence of the pretensioner 120, the meshing gears 76 and 78 cause the upper and lower wing structures 20 and 22 simultaneously to move from their retracted positions to their deployed positions. Moreover, rotation of the lower shaft 84 tends to wind the straps 100 onto the anchor bars 108. This causes the straps 100 to unwind from the upper shaft 82, and thereby to rotate the upper shaft 82 so as to pivot the actuator arm 90 forward. The wing structures 20 and 22 are thus urged toward their deployed positions by the actuator arm 90 as well as the meshing gears 76 and 78.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a vehicle seat having a wing, said wing being movable from a retracted position to a deployed position in which said wing projects forward over one of the occupant's shoulders and forward beside one of the occupant's upper arms to restrain upward movement of the occupant off said seat and lateral movement of one of occupant's upper arms outward from a side of said seat; and
    an actuating assembly which automatically moves said wing from said retracted position to said deployed position upon the occurrence of a vehicle crash.

2. Apparatus as defined in claim 1 wherein said seat has a cushion comprising a compressible base separate from said wing, said cushion further comprising a cover layer, said cover layer extending over said base and further extending from said base over said wing.

3. Apparatus as defined in claim 1 wherein said seat includes a back cushion with a compressible base, said wing being located behind the occupant and above said compressible base when said wing is in said retracted position.

4. Apparatus as defined in claim 3 wherein said wing is one of a pair of wings which are movable together from retracted positions to deployed positions projecting forward over the occupant's shoulders and beside the occupant's upper arms.

5. Apparatus as defined in claim 4 further wherein said actuating assembly includes means for sensing a condition indicating the occurrence of a rollover crash.

6. Apparatus as defined in claim 1 wherein said seat includes a back cushion with a compressible base, said wing being located behind the occupant and beside said compressible base when said wing is in said retracted position.

7. Apparatus as defined in claim 6 wherein said wing is one of a pair of wings which are movable together from retracted positions to deployed positions projecting forward beside the occupant's upper arms.

8. Apparatus as defined in claim 7 wherein said actuating assembly includes means for sensing a condition indicating the occurrence of a side impact crash.

9. Apparatus as defined in claim 1 wherein said seat further has a second wing which is movable from a retracted position to a deployed position projecting upward beside one of the occupant's legs, said actuating assembly including means for interconnecting said wings for movement simultaneously from said retracted positions to said deployed positions.

10. Apparatus as defined in claim 9 wherein said actuating assembly includes means for sensing a condition indicating the occurrence of a side impact crash.

11. Apparatus as defined in claim 1 wherein said actuating assembly includes means for moving said wing from said retracted position to said deployed position under the influence of a vehicle crash force applied to said seat by an occupant of said seat.

12. Apparatus comprising:
a vehicle seat having a wing, said wing being movable from a retracted position to a deployed position in which said wing projects adjacent to an occupant of said seat to restrain movement of the occupant off said seat;
an actuating assembly which moves said wing from said retracted position to said deployed position upon the occurrence of a vehicle crash; and
said wing further comprising upper and lower wing structures interconnected so as to pivot simultaneously and about separate axes from said retracted position to said deployed position, said upper wing structure projecting forward beside one of the occupant's upper arms when in said deployed position to restrain lateral movement of one of the occupant's upper arms outward from a side of said seat.

13. Apparatus as defined in claim 12 wherein said lower wing structure projects upward beside one of the occupant's legs when in said deployed position.

14. Apparatus as defined in claim 13 wherein said seat includes a bottom cushion with a compressible base, said lower wing structure being located beside said compressible base when said wing is in said retracted position.

15. Apparatus as defined in claim 14 wherein said lower wing structure is one of a pair of structures which are movable together from retracted positions to deployed positions projecting upward beside the occupant's legs.

16. Apparatus as defined in claim 15 wherein said actuating assembly includes means for sensing a condition indicating the occurrence of a side impact crash.

17. Apparatus as defined in claim 12 wherein said lower wing structure is movable from a retracted position to a deployed position projecting upward beside one of the occupant's legs, and said actuating assembly including means for interconnecting said wing structures for movement simultaneously from said retracted position to said deployed position.

18. Apparatus as defined in claim 12 wherein said actuating assembly includes means for sensing a condition indicating the occurrence of a rollover crash.

19. Apparatus comprising:
a vehicle seat having a wing, said wing being movable from a retracted position to a deployed position in which said wing projects forward over one of the occupant's shoulders to restrain upward movement of the occupant off said seat; and
an actuating assembly which automatically moves said wing from said retracted position to said deployed position upon the occurrence of a vehicle crash,
said seat having a cushion including a compressible base separate from said wing and a cover layer extending over said base and over said wing.

* * * * *